United States Patent
Panandiker et al.

(10) Patent No.: US 10,781,413 B2
(45) Date of Patent: *Sep. 22, 2020

(54) DRYER SHEETS COMPRISING BRANCHED POLYESTER POLYMERS

(71) Applicant: The Procter & Gamble Company, Cincinnati, OH (US)

(72) Inventors: Rajan Keshav Panandiker, West Chester, OH (US); Bernard William Kluesener, Harrison, OH (US); Heather Anne Doria, Ross Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/260,180

(22) Filed: Jan. 29, 2019

(65) Prior Publication Data
US 2019/0233786 A1 Aug. 1, 2019

Related U.S. Application Data

(60) Provisional application No. 62/623,034, filed on Jan. 29, 2018, provisional application No. 62/675,823, filed on May 24, 2018.

(51) Int. Cl.
| | |
|---|---|
| *C11D 9/44* | (2006.01) |
| *C11D 17/04* | (2006.01) |
| *C11D 3/50* | (2006.01) |
| *C11D 3/37* | (2006.01) |
| *D06M 13/00* | (2006.01) |
| *D06B 1/08* | (2006.01) |
| *D06M 23/02* | (2006.01) |
| *C08L 67/04* | (2006.01) |
| *C08G 63/06* | (2006.01) |
| *C11D 3/00* | (2006.01) |
| *C09D 167/04* | (2006.01) |
| *C08G 63/685* | (2006.01) |

(52) U.S. Cl.
CPC ............ *C11D 17/047* (2013.01); *C08G 63/06* (2013.01); *C08G 63/6852* (2013.01); *C08L 67/04* (2013.01); *C09D 167/04* (2013.01); *C11D 3/001* (2013.01); *C11D 3/3715* (2013.01); *C11D 3/50* (2013.01); *D06B 1/08* (2013.01); *D06M 13/005* (2013.01); *D06M 23/02* (2013.01)

(58) Field of Classification Search
CPC ...................................................... C11D 9/44
See application file for complete search history.

(56) References Cited

U.S. PATENT DOCUMENTS

| | | | |
|---|---|---|---|
| 4,203,877 A | 5/1980 | Baker | |
| 10,301,575 B2 | 5/2019 | Lynch | |
| 2008/0255317 A1 | 10/2008 | Schaefer | |
| 2011/0097369 A1 | 4/2011 | Sunder | |
| 2011/0201533 A1 | 8/2011 | Ponder | |
| 2013/0310301 A1 | 11/2013 | Sivik | |
| 2016/0024431 A1* | 1/2016 | Dykstra | C11D 3/0018/137 |
| 2016/0312041 A1 | 10/2016 | Azemar | |
| 2018/0051235 A1 | 2/2018 | Schubert et al. | |
| 2019/0233763 A1 | 8/2019 | Panandiker | |
| 2019/0233764 A1 | 8/2019 | Panandiker | |
| 2019/0233786 A1 | 8/2019 | Panandiker | |
| 2019/0367839 A1 | 12/2019 | Panandiker | |
| 2019/0367841 A1 | 12/2019 | Panandiker | |
| 2019/0367850 A1 | 12/2019 | Panandiker | |

FOREIGN PATENT DOCUMENTS

| | | |
|---|---|---|
| DE | 2430342 A1 | 1/1975 |
| WO | WO2012020992 A2 | 2/2012 |
| WO | WO2013174622 A1 | 11/2013 |

OTHER PUBLICATIONS

International Search Report; International Application No. PCT/US2019/015496; dated Mar. 22, 2019; 13 pages.
International Search Report; International Application No. PCT/US2019/015497; dated Mar. 25, 2019; 14 pages.
International Search Report; International Application No. PCT/US2019/034480; dated Jul. 31, 2019; 15 pages.
International Search Report; International Application No. PCT/US2019/034481; dated Jul. 31, 2019; 14 pages.
All Office Actions for U.S. Appl. No. 16/260,162, filed Jan. 29, 2019.
All Office Actions for U.S. Appl. No. 16/260,178, filed Jan. 29, 2019.
All Office Actions for U.S. Appl. No. 16/425,978, filed May 30, 2019.
All Office Actions for U.S. Appl. No. 16/425,989, filed May 30, 2019.
All Office Actions for U.S. Appl. No. 16/425,991, filed May 30, 2019.
European Search Report for Application No. /Patent No. 19177497.5-1105, dated Jul. 31, 2019, 7 pages.

* cited by examiner

*Primary Examiner* — Charles I Boyer
(74) *Attorney, Agent, or Firm* — Gary J. Foose

(57) ABSTRACT

The present invention relates to dryer sheets comprising branched polyester polymers and methods of making and using such dryer sheets. Such dryer sheets, can comprise a variety substrate materials and provide the desired level of performance without the technical and economic drawbacks of conventional dryer sheets.

20 Claims, No Drawings

DRYER SHEETS COMPRISING BRANCHED POLYESTER POLYMERS

FIELD OF THE INVENTION

The present invention relates to dryer sheets comprising branched polyester polymers and methods of making and using such dryer sheets.

BACKGROUND OF THE INVENTION

Quaternary ammonium softeners are used a softening agent in dryer sheets. Unfortunately, such softening agents have several drawbacks which include a narrow pH formulation window, less than desirable stability and/or softening performance.

Applicants recognized that the aforementioned drawbacks are due to one or more of the following factors: inadequate softness performance and lack of compatibility with anionic materials such as anionic surfactants for quaternary ammonium compounds; While polymeric softening agents with high molecular weights give improved performance, high viscosity of the polymeric softening agents, such as silicones, makes them difficult to process and dispose of.

Thus, what is needed is a dryer sheet that comprises a softener without such drawbacks. Applicants discovered that branched polyester polymers can serve as softening actives and that such that branched polyester polymers do not have the aforementioned drawbacks.

SUMMARY OF THE INVENTION

The present invention relates to dryer sheets comprising branched polyester polymers and methods of making and using such dryer sheets. Such dryer sheets, can comprise a variety substrate materials and provide the desired level of performance without the technical and economic drawbacks of conventional dryer sheets.

DETAILED DESCRIPTION OF THE INVENTION

As used herein "MORV" is the calculated malodor reduction value for a subject material. A material's MORV indicates such material's ability to decrease or even eliminate the perception of one or more malodors. For purposes of the present application, a material's MORV is calculated in accordance with method found in the test methods section of the present application.

As used herein, the term "perfume" does not include malodor reduction materials. Thus, the perfume portion of a composition does not include, when determining the perfume's composition, any malodor reduction materials found in the composition as such malodor reduction materials are described herein. In short, if a material has a malodor reduction value "MORV" that is within the range of the MORV recited in the subject claim, such material is a malodor reduction material for purposes of such claim.

As used herein, "malodor" refers to compounds generally offensive or unpleasant to most people, such as the complex odors associated with bowel movements.

As used herein, "odor blocking" refers to the ability of a compound to dull the human sense of smell.

As used herein, "odor masking" refers to the ability of a compound with a non-offensive or pleasant smell that is dosed such that it limits the ability to sense a malodorous compound. Odor-masking may involve the selection of compounds which coordinate with an anticipated malodor to change the perception of the overall scent provided by the combination of odorous compounds.

As used herein, the terms "a" and "an" mean "at least one".

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Dryer Sheets

A) A dryer sheet comprising a substrate that has a surface and a branched polyester polymer, that coats at least a portion of said substrate's surface, said branched polyester polymer being selected from the group consisting of:

(i) a branched polyester having Formula 1

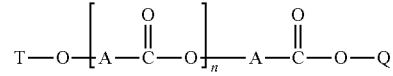

Formula 1 wherein:

each A is independently a branched hydrocarbon chain comprising 4 to 100 carbon atoms;

Q is selected from an alkyl chain comprising 1 to 30 carbon atoms and a hydrogen atom;

T is a hydrogen atom or a —C(O)—R wherein each R is an alkyl chain comprising 1 to 30 carbon atoms and n is an integer from 1 to about 100;

(ii) a branched polyester having Formula 2

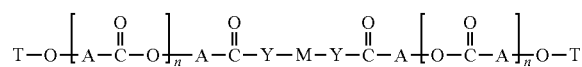

each n is independently an integer from 1 to about 100;

each A is independently a branched hydrocarbon chain comprising 4 to 100 carbon atoms;

each T is independently a hydrogen atom or a —C(O)—R wherein each R is an alkyl chain comprising 1 to 30 carbon atoms;

each Y is independently a linking group selected from the group consisting of oxygen and $NR_2$, wherein each $R_2$ is independently selected from the group consisting of hydrogen, or a $C_1$-$C_8$ alkyl;

M is a polyalkylene glycol group;

(iii) mixtures thereof is disclosed.

B) The dryer sheet according to Paragraph A), comprising a substrate that has a surface, preferably a flexible substrate, more preferably a flexible substrate that is a sheet; and a branched polyester polymer, that coats at least a portion of said substrate's surface said dryer sheet having a weight ratio of branched polyester polymer to dry substrate ranging from about 10:1 to about 0.5:1, preferably from about 5:1 to about 1:1, said branched polyester polymer being selected from the group consisting of:

(i) the branched polyester of the Formula 1

$$\text{T}-\text{O}-\left[\text{A}-\overset{\text{O}}{\underset{\|}{\text{C}}}-\text{O}\right]_n-\text{A}-\overset{\text{O}}{\underset{\|}{\text{C}}}-\text{O}-\text{Q} \qquad \text{Formula 1}$$

wherein:

each A is independently a branched hydrocarbon chain comprising from 4 to 40 carbon atoms, preferably from 12 to 20 carbon atoms, more preferably 17 carbon atoms Q is selected from an alkyl chain comprising 1 to 30 carbon atoms and a hydrogen atom, preferably Q is a hydrogen atom;

T is a hydrogen atom or a —C(O)—R wherein each R is an alkyl chain comprising from 7 to 21 carbon atoms, preferably from 11 to 17 carbon atoms and n is an integer from 4 to 40, preferably n is an integer from 5 to 20

(ii) the branched polyester of the Formula 2

$$\text{T}-\text{O}-\left[\text{A}-\overset{\text{O}}{\underset{\|}{\text{C}}}-\text{O}\right]_n-\text{A}-\overset{\text{O}}{\underset{\|}{\text{C}}}-\text{Y}-\text{M}-\text{Y}-\overset{\text{O}}{\underset{\|}{\text{C}}}-\text{A}-\left[\text{O}-\overset{\text{O}}{\underset{\|}{\text{C}}}-\text{A}\right]_n-\text{O}-\text{T}$$

wherein:

n is an integer from 4 to 40, preferably n is an integer from 5 to 20 each A is independently a branched hydrocarbon chain comprising from 4 to 40 carbon atoms, preferably from 12 to 20 carbon atoms, more preferably 17 carbon atoms each T is independently a hydrogen atom or a —C(O)—R wherein each R is an alkyl chain comprising from 7 to 21 carbon atoms, preferably from 11 to 17 carbon atoms;

each Y is independently a linking group selected from the group consisting of oxygen and $NR_2$, wherein each $R_2$ is independently selected from the group consisting of hydrogen, or a $C_1$-$C_8$ alkyl, preferably each $R_2$ is hydrogen;

M is a polyalkylene glycol group, preferably M has the structure $$-\left(\text{CH}_2-\underset{\underset{R_1}{|}}{\text{CH}}-\text{O}\right)_j-\text{CH}_2-\underset{\underset{R_1}{|}}{\text{CH}}-$$

wherein each $R_1$ is selected from hydrogen, methyl and ethyl;

j is an integer from 0 to about 400, preferably from 2 to about 50;

and (iii) mixtures thereof, is disclosed.

C) The dryer sheet according to any of Paragraphs A) through B) wherein said branched polyester polymer having Formula 1 and Formula 2 each have a weight average molecular weight of from about 500 g/mol to about 100,000 g/mol, preferably from about 1000 g/mol to about 60,000 g/mol, more preferably from about 1000 g/mol to about 10,000 g/mol, most preferably from about 1000 g/mol to about 5,000 g/mol, is disclosed.

D) The dryer sheet according to any of Paragraphs A) through C), wherein each A of said polyester polymers is independently a branched hydrocarbon with the structure $$-\underset{\underset{H}{|}}{\overset{\overset{R_3}{|}}{\text{C}}}-R_4-$$

wherein each $R_3$ is a monovalent alkyl or substituted alkyl group and $R_4$ is an unsaturated or saturated divalent alkylene radical comprising from 1 to about 24 carbon atoms, preferably each $R_3$ is a monovalent alkyl radical comprising 6 carbon atoms and each $R_4$ is an unsaturated or saturated divalent alkylene radical comprising from 10 carbon atoms, is disclosed.

E) The dryer sheet according to any of Paragraphs A) through D), wherein each A of said polyester polymers has the structure:

is disclosed.

F) The dryer sheet according to Paragraphs A) through B) wherein the branched polyester polymer has an iodine value from about 0 to about 90, preferably from about 0.4 to about 50, more preferably from about 1 to about 30, is disclosed.

G) The dryer sheet according to any of Paragraphs A) through F) wherein, said substrate comprises a rayon and/or polyester non-woven fabric, preferably a rayon and/or polyester non-woven fabrics having a basis weight of from about 0.4 oz./yd2 to about 1 oz./$yd^2$, more preferably from about 0.5 oz./$yd^2$ to about 0.8 oz./$yd^2$, most preferably from about 0.5 oz./$yd^2$ to about 0.6 oz./$yd^2$, is disclosed.

H) The dryer sheet according to any of Paragraphs A) through G) wherein, said substrate comprises a chemically bonded, mechanically bonded, spun-bonded, or melt-bonded material.

I) The dryer sheet according to any of Paragraphs A) through H) claim comprising perfume and/or a perfume delivery system, preferably said perfume delivery system comprises a perfume capsule, more preferably a perfume capsule comprising a shell and a core comprising perfume, said shell encapsulating said core, said shell comprising a polyacrylate and/or an amnioplast, most preferably said perfume capsule has diameter of from about 1 micron to 200 microns or from 1 micron to 100 microns, is disclosed Substrates and Process of Making Dryer Sheets The present invention relates to fabric conditioning compositions which are delivered to fabric via dryer-added substrate that effectively releases the composition in an automatic laundry (clothes) dryer. Such dispensing means can be designed for single usage or for multiple uses. The dispensing means can also be a "carrier material" that releases the fabric conditioning composition and then is dispersed and/or exhausted from the dryer. When the dispensing means is a flexible substrate, e.g., in sheet configuration, the fabric conditioning composition is releasably affixed on the substrate to provide a weight ratio of branched polyester polymer to dry substrate ranging from about 10:1 to about 0.5:1, preferably from about 5:1 to about 1:1. To insure release, preferred flexible sheets withstand the dryer environment without decomposing or changing shape, e.g. combusting, creating off odors, or shrinking with heat or moisture. Substrates especially useful herein are rayon and/or polyester non-woven fabrics.

Non-limiting examples of the substrates useful herein are cellulosic rayon and/or polyester non-woven fabrics having basis weights of from about 0.4 oz./yd2 to about 1 oz./yd2, preferably from about 0.5 oz./yd2 to about 0.8 oz./yd2, more preferably from about 0.5 oz./yd2 to about 0.6 oz./yd2. These substrates are typically prepared using, e.g., rayon and/or polyester fibers having deniers of from about 1 to about 8, preferably from about 3 to about 6, and more preferably about 4 to 6 or mixtures of different deniers. Typically, the fiber is a continuous filament or a 3/16 inch to 2 inch fiber segment that is laid down, in a pattern that results in a multiplicity of layers and intersections between overlayed portions of the filament or fiber, on a belt, preferably foraminous, and then the fiber intersections are glued and/or fused into fiber-to-fiber bonds by a combination of an adhesive binder, and/or heat and/or pressure. As non-limiting examples, the substrate may be spun-bonded, melt-bonded, or point bonded or combinations of bonding processes may be chosen. The substrate breaking strength and elasticity in the machine and cross direction is sufficient to enable the substrate to be conveyed through a coating process. The porosity of the substrate article is sufficient to enable air flow through the substrate to promote conditioning active release and prevent dryer vent blinding. The substrate may also have a plurality of rectilinear slits extended along one dimension of the substrate.

The dispensing means will normally carry an effective amount of fabric conditioning composition. Such effective amount typically provides sufficient softness, antistatic effect and/or perfume deposition for at least one treatment of a minimum load in an automatic laundry dryer. Amounts of the fabric conditioning composition irrespective of load size for a single article can vary from about 0.1 g to about 100 g, preferably from about 0.1 g to about 20 g, most preferably from about 0.1 g to about 10 g. Amounts of fabric treatment composition for multiple uses, e.g., up to about 30, can be used.

The dryer sheet can be prepared by loading the fabric conditioning agent onto the nonwoven substrate. Loading can be achieved by a number of methods including spraying the branched polyester polymer on to the desired substrate and running the substrate through a bath of said polymer.

The nonwoven substrate can include a binder to help hold the fiber together. Exemplary binders that can be used include latexes. The addition of a binder such as a latex can be referred to as a form of chemical bonding. The latexes can be provided as polyacrylates, styrene, butadiene, copolymers, styrene acrylic copolymers, ethylene, vinyl acetate copolymers, nitrile rubbers, polyvinyl chloride, polyvinyl acetate, ethylene acrylate copolymers, vinyl acetate acrylate copolymers, or mixtures thereof. When the nonwoven substrate includes a binder, the nonwoven substrate can include the binder in an amount of about 0.5 wt. % to about 25 wt. %, and can include the binder in an amount of about 2 wt. % to about 15 wt. %.

The nonwoven substrate can be provided without a binder. It should be understood that the term "binder" refers to a chemical binding agent. Other forms of binding can occur in the nonwoven substrate. For example, there can be mechanical binding. An example of mechanical binding includes entanglement. The fibers of the nonwoven substrate can be hydroentangled, if desired. In addition, binding can include hydrogen bonding (e.g., of the cellulosic fibers), or mechanical bonding (hydroentanglement, needle punch, or stitch bonding).

Additional Components

Materials that are useful in the present invention include: surfactants, delivery enhancing agents, chelating agents, dye transfer inhibiting agents, clay, dyes, additional perfumes and perfume delivery systems, structure elasticizing agents, fabric softener actives, fabric care benefit agents, anionic surfactant scavengers, carriers, processing aids, formaldehyde scavengers and/or pigments. Other embodiments of Applicants' compositions do not contain one or more of said additional materials. The precise nature of these additional components, and levels of incorporation thereof, will depend on the physical form of the composition and the nature of the operation for which it is to be used. However, when one or more adjuncts are present, such one or more adjuncts may be present as detailed below. The following is a non-limiting list of suitable additional adjuncts.

Surfactants:

The products of the present invention may comprise from about 0.11% to 80% by weight of a surfactant. In one aspect, such compositions may comprise from about 5% to 50% by weight of surfactant. Surfactants utilized can be of the anionic, nonionic, zwitterionic, ampholytic or cationic type or can comprise compatible mixtures of these types.

The compositions of the present invention can contain up to about 30%, alternatively from about 0.01% to about 20%, more alternatively from about 0.1% to about 10%, by weight of the composition, of a nonionic surfactant. In one embodiment, the nonionic surfactant may comprise an ethoxylated nonionic surfactant.

Suitable for use herein are the ethoxylated alcohols and ethoxylated alkyl phenols of the formula $R(OC_2H_4)_n OH$, wherein R is selected from the group consisting of aliphatic hydrocarbon radicals containing from about 8 to about 20 carbon atoms and alkyl phenyl radicals in which the alkyl groups contain from about 8 to about 12 carbon atoms, and the average value of n is from about 5 to about 15. Materials may also be propoxylated alcohols and propoxylated alkyl phenols, and mixtures of such propoxylated and ethoxylated materials may be used. Furthermore, such materials may be propoxylated and ethoxylated.

Suitable nonionic surfactants are those of the formula $R^1(OC_2H_4)_nOH$, wherein $R^1$ is a $C_{10}$-$C_{16}$ alkyl group or a $C_8$-$C_{12}$ alkyl phenyl group, and n is from 3 to about 80. In one aspect, particularly useful materials are condensation products of $C_9$-$C_{15}$ alcohols with from about 5 to about 20 moles of ethylene oxide per mole of alcohol.

The Quaternary Ammonium Ester Softening Active

The dryer sheets of the present invention may comprise a quaternary ammonium ester softening active (Fabric Softening Active, "FSA") at a level of from 3% to 25%, preferably from 4% to 18%, more preferably from 5% to 15%. Preferably, the iodine value (see Methods) of the parent fatty acid from which the quaternary ammonium fabric softening active is formed is from 25 to 50, preferably from 30 to 48, more preferably from 32 to 45. Without being bound by theory, lower melting points resulting in easier processability of the FSA are obtained when the parent fatty acid from which the quaternary ammonium fabric softening active is formed is at least partially unsaturated. Especially double unsaturated fatty acids enable easy to process FSA's. In preferred versions of dryer sheets, the parent fatty acid from which the quaternary ammonium softening actives is formed comprises from 2.0% to 20.0%, preferably from 3.0% to 15.0%, more preferably from 4.0% to 15.0% of double unsaturated C18 chains ("C18:2") by weight of total fatty acid chains (see Methods). On the other hand, very high levels of unsaturated fatty acid chains are to be avoided to minimize malodor formation as a result of oxidation of the fabric softener composition over time.

In preferred versions of dryer sheets, the quaternary ammonium ester softening active is present at a level of from 4.0% to 18%, more preferably from 4.5% to 15%, even more preferably from 5.0% to 12% by weight of the composition. The level of quaternary ammonium ester softening active may depend of the desired concentration of total softening active in the composition (diluted or concentrated composition) and of the presence or not of other softening active. However, the risk on increasing viscosities over time is typically higher in fabric softener compositions with higher FSA levels. On the other hand, at very high FSA levels, the viscosity may no longer be sufficiently controlled which renders the product unfit for use.

Suitable quaternary ammonium ester softening actives include but are not limited to, materials selected from the group consisting of monoester quats, diester quats, triester quats and mixtures thereof. Preferably, the level of monoester quat is from 2.0% to 40.0%, the level of diester quat is from 40.0% to 98.0%, the level of triester quat is from 0.0% to 25.0% by weight of total quaternary ammonium ester softening active.

Said quaternary ammonium ester softening active may comprise compounds of the following formula:

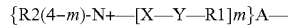

wherein:
m is 1, 2 or 3 with proviso that the value of each m is identical;
each R1 is independently hydrocarbyl, or branched hydrocarbyl group, preferably R1 is linear, more preferably R1 is partially unsaturated linear alkyl chain;
each R2 is independently a C1-C3 alkyl or hydroxyalkyl group, preferably R2 is selected from methyl, ethyl, propyl, hydroxyethyl, 2-hydroxypropyl, 1-methyl-2 hydroxyethyl, poly(C2-C3¬ alkoxy), polyethoxy, benzyl;
each X is independently —(CH2)n-, —CH2-CH(CH3)- or —CH—(CH3)-CH2- and
each n is independently 1, 2, 3 or 4, preferably each n is 2;
each Y is independently —O—(O)C— or —C(O)—O—;
A- is independently selected from the group consisting of chloride, methyl sulfate, and ethyl sulfate, preferably A- is selected from the group consisting of chloride and methyl sulfate, more preferably A is methyl sulfate;
with the proviso that when Y is —O—(O)C—, the sum of carbons in each R1 is from 13 to 21, preferably from 13 to 19. Preferably, X is —CH2-CH(CH3)- or —CH—(CH3)-CH2- to improve the hydrolytic stability of the quaternary ammonium ester softening active, and hence further improve the stability of the fabric softener composition. Examples of suitable quaternary ammonium ester softening actives are commercially available from Evonik under the tradename Rewoquat WE18, Rewoquat WE20, from Stepan under the tradename Stepantex GA90, Stepantex VK90, Stepantex VL90A.

These types of agents and general methods of making them are disclosed in U.S. Pat. No. 4,137,180.

Fabric Care Benefit Agent

The compositions disclosed herein may include a fabric care benefit agent. As used herein, "fabric care benefit agents" refers to ingredients which are water dispersible or water insoluble and can provide fabric care benefits such as fabric softening, color protection, pill/fuzz reduction, anti-abrasion, anti-wrinkle, perfume longevity and the like, to garments and fabrics, particularly on cotton garments and fabrics.

These fabric care benefit agents typically have the solubility in distilled water of less than 100 g/L, preferably less than 10 g/L at 25° C. It is believed that if the solubility of the fabric care benefit agent is more than 10 g/L, it will remain soluble in the wash liquor and consequently will not deposit onto the fabrics.

Suitable fabric care benefit agents, include, but are not limited to, materials selected from the group consisting of non-ester quaternary ammonium compounds, amines, fatty esters, sucrose esters, silicones, dispersible polyolefins, polysaccharides, fatty acids, softening oils, polymer latexes and combinations thereof.

The fabric care benefit agents can be in the form of emulsions, latexes, dispersions, suspensions, micelles and the like, and preferably in the form of microemulsions, swollen micelles or latexes. As such, they can have a wide range of particle sizes from about 1 nm to 100 um and preferably from about 5 nm to 10 um. The particle size of the microemulsions can be determined by conventional methods, such as using a Leeds & Northrup Microtrac UPA particle sizer.

Emulsifiers, dispersing agents and suspension agents may be used. The weight ratio of emulsifiers, dispersing agents or suspension agents to the fabric care benefit agents is about 1:100 to about 1:2. Preferably, the weight ratio ranges from about 1:50 to 1:5. Any surfactants suitable for making polymer emulsions or emulsion polymerizations of polymer latexes can be used to make the water insoluble fabric care benefit agents of the present invention. Suitable surfactants include anionic, cationic, and nonionic surfactants or mixtures thereof.

Silicones

Suitable organosilicones, include, but not limited to (a) non-functionalized silicones such as polydimethylsiloxane (PDMS); and (b) functionalized silicones such as silicones with one or more functional groups selected from the group consisting of amino, amido, alkoxy, alkyl, phenyl, polyether, acrylate, siliconehydride, mercaptoproyl, carboxylate, sulfate phosphate, quaternized nitrogen, and combinations thereof.

In typical embodiments, the organosilicones suitable for use herein have a viscosity ranging from about 10 to about 2,000,000 CSt (centistokes) at 25° C. In other embodiments, the suitable organosilicones have a viscosity from about 10 to about 800,000 CSt at 25° C.

(a) Polydimethylsiloxanes (PDMS) have been described in Cosmetics and Toiletries. They can be linear, branched, cyclic, grafted or cross-linked or cyclic structures. In some embodiments, the detergent compositions comprise PDMS having a viscosity of from about 100 to about 700,000 CSt at 25° C.

(b) Exemplary functionalized silicones include but are not limited to aminosilicones, amidosilicones, silicone polyethers, alkylsilicones, phenyl silicones and quaternary silicones.

The functionalized silicones suitable for use in the present invention have the following general formula:

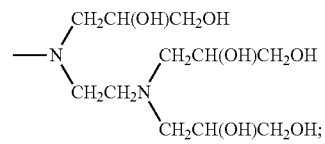

wherein
m is from 4 to 50,000, preferably from 10 to 20,000;
k is from 1 to 25,000, preferably from 3 to 12,000;
each R is H or $C_1$-$C_8$ alkyl or aryl group, preferably $C_1$-$C_4$ alkyl, and more preferably a methyl group;

X is a linking group having the formula:
i) —$(CH_2)_p$— wherein p is from 2 to 6, preferably 2 to 3;
ii)

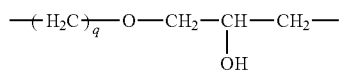

wherein q is from 0 to 4, preferably 1 to 2;
iii)

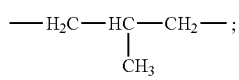

Q has the formula:
i) —$NH_2$, —NH—$(CH_2)_r$—$NH_2$, wherein r is from 1 to 4, preferably 2 to 3; or
ii) —(O—$CHR_2$—$CH_2)_s$—Z, wherein s is from 1 to 100, preferably 3 to 30;

wherein $R_2$ is H or $C_1$-$C_3$ alkyl, preferably H or $CH_3$; and Z is selected from the group consisting of —$OR_3$, —$OC(O)R_3$, —CO—$R_4$—COOH, —$SO_3$, —$PO(OH)_2$, and mixtures thereof; further wherein $R_3$ is H, $C_1$-$C_{26}$ alkyl or substituted alkyl, $C_6$-$C_{26}$ aryl or substituted aryl, $C_7$-$C_{26}$ alkylaryl or substituted alkylaryl groups, preferably $R_3$ is H, methyl, ethyl propyl or benzyl groups; $R_4$ is —$CH_2$— or —$CH_2CH_2$— groups; and
iii)

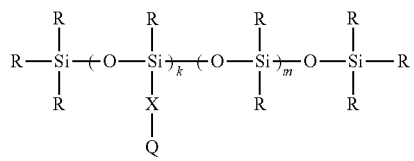

iv)

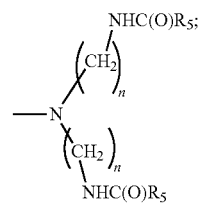

wherein n is from 1 to 4, preferably 2 to 3; and $R_5$ is C1-C4 alkyl, preferably methyl.

Another class of organosilicone useful herein is modified polyalkylene oxide polysiloxanes of the general formula:

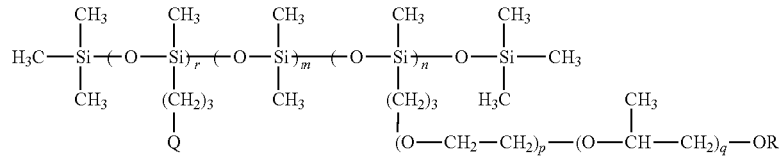

wherein Q is $NH_2$ or —$NHCH_2CH_2NH_2$; R is H or $C_1$-$C_6$ alkyl; r is from 0 to 1000; m is from 4 to 40,000; n is from 3 to 35,000; and p and q are integers independently selected from 2 to 30.

When r=0, nonlimiting examples of such polysiloxanes with polyalkylene oxide are Silwet® L-7622, Silwet® L-7602, Silwet® L-7604, Silwet® L-7500, Magnasoft® TLC, available from GE Silicones of Wilton, Conn.; Ultrasil® SW-12 and Ultrasil® DW-18 silicones, available from Noveon Inc., of Cleveland Ohio; and DC-5097, FF-400® available from Dow Corning® of Midland, Mich. Additional examples are KF-352®, KF-6015®, and KF-945®, all available from Shin Etsu Silicones of Tokyo, Japan.

When r=1 to 1000, nonlimiting examples of this class of organosilicones are Ultrasil® A21 and Ultrasil® A-23, both available from Noveon, Inc. of Cleveland, Ohio; BY16-876® from Dow Corning Toray Ltd., Japan; and X22-3939A® from Shin Etsu Corporation, Tokyo Japan.

A third class of organosilicones useful herein is modified polyalkylene oxide polysiloxanes of the general formula:

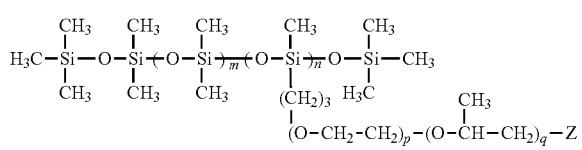

wherein m is from 4 to 40,000; n is from 3 to 35,000; and p and q are integers independently selected from 2 to 30; Z is selected from
i.

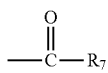

wherein $R_7$ is C1-C24 alkyl group;
ii.

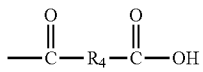

wherein $R_4$ is $CH_2$ or $CH_2CH_2$;
iii. $-SO_3$
iv.

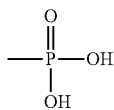

v.

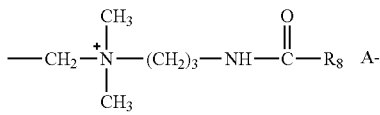

wherein $R_8$ is C1-C22 alkyl and A- is an appropriate anion, preferably Cl⁻;
vi.

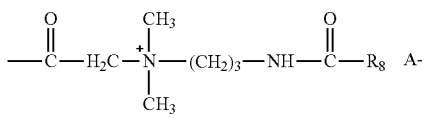

wherein $R_8$ is C1-C22 alkyl and A- is an appropriate anion, preferably Cl⁻.

Another class of silicones is cationic silicones. These are typically produced by reacting a diamine with an epoxide. These are commercially available under the trade names Magnasoft® Prime, Magnasoft® HSSD, Silsoft® A-858 (all from GE Silicones).

In another aspect, the functionalized siloxane polymer may comprise silicone-urethanes. In one aspect, the synthesis of silicone-urethanes involves a conventional polycondensation reaction between a polysiloxane containing hydroxy functional groups or amine functional groups at the ends of its chain (for example, α, ω-dihydroxyalkylpolydimethylsiloxane or α, ω-diaminoalkylpolydimethylsiloxane or α-amino, ω-hydroxyalkylpolydimethylsiloxane) and a diisocyanate. In another aspect, organopolysiloxane oligomers containing a hydroxyalkyl functional group or an aminoalkyl functional group at the ends of its chain may be mixed with an organic diol or diamine coupling agent in a compatible solvent. The mixture may be then reacted with a diisocyanate. Silicone-urethanes are commercially available from Wacker Silicones under the trade name SLM-21200.

One embodiment of the composition of the present invention contains organosilicone emulsions, which comprise organosilicones dispersed in a suitable carrier (typically water) in the presence of an emulsifier (typically an anionic surfactant).

In another embodiment, the organosilicones are in the form of microemulsions. The organosilicone microemulsions may have an average particle size in the range from about 1 nm to about 150 nm, or from about 10 nm to about 100 nm, or from about 20 nm to about 50 nm. Microemulsions are more stable than conventional macroemulsions (average particle size about 1-20 microns) and when incorporated into a product, the resulting product has a preferred clear appearance. More importantly, when the composition is used in a typical aqueous wash environment, the emulsifiers in the composition become diluted such that the microemulsions can no longer be maintained and the organosilicones coalesce to form significantly larger droplets which have an average particle size of greater than about 1 micron. Since the selected organosilicones are water insoluble or have limited solubility in water, they will crash out of the wash liquor, resulting in more efficient deposition onto the fabrics and enhanced fabric care benefits. In a typical immersive wash environment, the composition is mixed with an excess of water to form a wash liquor, which typically has a weight ratio of water:composition ranging from 10:1 to 400:1.

A typical embodiment of the composition comprising from about 0.01% to about 10%, by weight of composition of the organosilicones and an effective amount of an emulsifier in a carrier. The "effective amount" of emulsifier is the amount sufficient to produce an organosilicone microemulsion in the carrier, preferably water. In some embodiments, the amount of emulsifiers ranges from about 5 to about 75 parts, or from about 25 to about 60 parts per 100 weight parts organosilicone.

The microemulsion typically comprises from about 10 to about 70%, or from about 25 to about 60%, by weight of the microemulsion of the dispersed organosilicones; from about 0.1 to about 30%, or from about 1 to about 20%, by weight of the microemulsion of anionic surfactant; optionally, from about 0 to about 3%, or from about 0.1 to about 20%, by weight of the microemulsion of nonionic surfactant; and the balance being water, and optionally other carriers. Selected organosilicone polymers (all those disclosed herein above, excluding PDMS and cationic silicones) are suitable for forming microemulsions; these organosilicones are sometimes referred to as the "self-emulsifying silicones". Emulsifiers, particularly anionic surfactants, may be added to aid the formation of organosilicone microemulsions in the composition. Optionally, nonionic surfactants useful as laundry adjuncts to provide detersive benefits can also aid the formation and stability of the microemulsions. In a typical embodiment, the amount of emulsifiers is from about 0.05% to about 15% by weight of the composition.

Non-Ester Quaternary Ammonium Compounds:

Suitable non-ester quaternary ammonium compounds comprise compounds of the formula:

[R(4−m)-N+—R1m]X— wherein each R comprises either hydrogen, a short chain C1-C6, in one aspect a C1-C3 alkyl or hydroxyalkyl group, for example methyl, ethyl, propyl, hydroxyethyl, poly(C2-3⁻ alkoxy), polyethoxy, benzyl, or mixtures thereof; each m is 1, 2 or 3 with the proviso that the value of each m is the same; the sum of carbons in each R1 may be C12-C22, with each R1 being a hydrocarbyl, or substituted hydrocarbyl group; and X— may comprise any softener-compatible anion. The softener-compatible anion may comprise chloride, bromide, methylsulfate, ethylsulfate, sulfate, and nitrate. The softener-compatible anion may comprise chloride or methyl sulfate.

Non-limiting examples include dialkylenedimethylammonium salts such as dicanoladimethylammonium chloride, di(hard)tallowdimethylammonium chloride dicanoladimethylammonium methylsulfate, and mixtures thereof. An example of commercially available dialkylenedimethylammonium salts usable in the present invention is dioleyldimethylammonium chloride available from Witco Corporation under the trade name Adogen® 472 and dihardtallow dimethylammonium chloride available from Akzo Nobel Arquad 2HT75.

Amines

Suitable amines include but are not limited to, materials selected from the group consisting of amidoesteramines, amidoamines, imidazoline amines, alkyl amines, and combinations thereof. Suitable ester amines include but are not limited to, materials selected from the group consisting of monoester amines, diester amines, triester amines and combinations thereof. Suitable amidoamines include but are not limited to, materials selected from the group consisting of monoamido amines, diamido amines and combinations thereof. Suitable alkyl amines include but are not limited to, materials selected from the group consisting of mono alkylamines, dialkyl amines quats, trialkyl amines, and combinations thereof.

Fatty Acid:

The dryer sheets may comprise a fatty acid, such as a free fatty acid as fabric softening active. The term "fatty acid" is used herein in the broadest sense to include unprotonated or protonated forms of a fatty acid. One skilled in the art will readily appreciate that the pH of an aqueous composition will dictate, in part, whether a fatty acid is protonated or unprotonated. The fatty acid may be in its unprotonated, or salt form, together with a counter ion, such as, but not limited to, calcium, magnesium, sodium, potassium, and the like. The term "free fatty acid" means a fatty acid that is not bound to another chemical moiety (covalently or otherwise).

The fatty acid may include those containing from 12 to 25, from 13 to 22, or even from 16 to 20, total carbon atoms, with the fatty moiety containing from 10 to 22, from 12 to 18, or even from 14 (mid-cut) to 18 carbon atoms.

The fatty acids may be derived from (1) an animal fat, and/or a partially hydrogenated animal fat, such as beef tallow, lard, etc.; (2) a vegetable oil, and/or a partially hydrogenated vegetable oil such as canola oil, safflower oil, peanut oil, sunflower oil, sesame seed oil, rapeseed oil, cottonseed oil, corn oil, soybean oil, tall oil, rice bran oil, palm oil, palm kernel oil, coconut oil, other tropical palm oils, linseed oil, tung oil, castor oil, etc.; (3) processed and/or bodied oils, such as linseed oil or tung oil via thermal, pressure, alkali-isomerization and catalytic treatments; (4) combinations thereof, to yield saturated (e.g. stearic acid), unsaturated (e.g. oleic acid), polyunsaturated (linoleic acid), branched (e.g. isostearic acid) or cyclic (e.g. saturated or unsaturated disubstituted cyclopentyl or cyclohexyl derivatives of polyunsaturated acids) fatty acids.

Mixtures of fatty acids from different fat sources can be used.

The cis/trans ratio for the unsaturated fatty acids may be important, with the cis/trans ratio (of the C18:1 material) being from at least 1:1, at least 3:1, from 4:1 or even from 9:1 or higher.

Branched fatty acids such as isostearic acid are also suitable since they may be more stable with respect to oxidation and the resulting degradation of color and odor quality.

The fatty acid may have an iodine value from 0 to 140, from 50 to 120 or even from 85 to 105.

Polysaccharides:

The dryer sheets may comprise a polysaccharide as a fabric softening active, such as cationic starch. Suitable cationic starches for use in the present compositions are commercially available from Cerestar under the trade name C*BOND® and from National Starch and Chemical Company under the trade name CATO® 2A.

Sucrose Esters:

Sucrose esters may be used as a fabric softening active. Sucrose esters are typically derived from sucrose and fatty acids. Sucrose ester is composed of a sucrose moiety having one or more of its hydroxyl groups esterified.

Sucrose is a disaccharide. The sucrose molecule can be represented by the formula: M(OH)8, wherein M is the disaccharide backbone and there are total of 8 hydroxyl groups in the molecule.

Thus, sucrose esters can be represented by the following formula:

M(OH)8−x(OC(O)R1)x wherein x is the number of hydroxyl groups that are esterified, whereas (8−x) is the hydroxyl groups that remain unchanged; x is an integer selected from 1 to 8, alternatively from 2 to 8, alternatively from 3 to 8, or from 4 to 8; and R1 moieties are independently selected from C1-C22 alkyl or C1-C30 alkoxy, linear or branched, cyclic or acyclic, saturated or unsaturated, substituted or unsubstituted.

The R1 moieties may comprise linear alkyl or alkoxy moieties having independently selected and varying chain length. For example, R1 may comprise a mixture of linear alkyl or alkoxy moieties wherein greater than 20% of the linear chains are C18, alternatively greater than 50% of the linear chains are C18, alternatively greater than 80% of the linear chains are C18.

The R1 moieties may comprise a mixture of saturate and unsaturated alkyl or alkoxy moieties. The iodine value of the sucrose esters suitable for use herein ranges from 1 to 150, or from 2 to 100, or from 5 to 85. The R1 moieties may be hydrogenated to reduce the degree of unsaturation. In the case where a higher iodine value is preferred, such as from 40 to 95, then oleic acid and fatty acids derived from soybean oil and canola oil are suitable starting materials.

The unsaturated R1 moieties may comprise a mixture of "cis" and "trans" forms the unsaturated sites. The "cis"/"trans" ratios may range from 1:1 to 50:1, or from 2:1 to 40:1, or from 3:1 to 30:1, or from 4:1 to 20:1.

Dispersible Polyolefins and Latexes:

Generally, all dispersible polyolefins that provide fabric softening benefits can be used as fabric softening active in the present invention. The polyolefins can be in the form of waxes, emulsions, dispersions or suspensions.

The polyolefin may be chosen from a polyethylene, polypropylene, or combinations thereof. The polyolefin may be at least partially modified to contain various functional groups, such as carboxyl, alkylamide, sulfonic acid or amide groups. The polyolefin may be at least partially carboxyl modified or, in other words, oxidized.

Non-limiting examples of fabric softening active include dispersible polyethylene and polymer latexes. These agents can be in the form of emulsions, latexes, dispersions, suspensions, and the like. In one aspect, they are in the form of an emulsion or a latex. Dispersible polyethylenes and polymer latexes can have a wide range of particle size diameters ($\chi 50$) including but not limited to from 1 nm to 100 µm; alternatively, from 10 nm to 10 µm. As such, the particle sizes of dispersible polyethylenes and polymer latexes are generally, but without limitation, smaller than silicones or other fatty oils.

Generally, any surfactant suitable for making polymer emulsions or emulsion polymerizations of polymer latexes can be used as emulsifiers for polymer emulsions and latexes used as fabric softeners active in the present invention. Suitable surfactants include anionic, cationic, and non-ionic surfactants, and combinations thereof. In one aspect, such surfactants are non-ionic and/or anionic surfactants. In one aspect, the ratio of surfactant to polymer in the fabric softening active is 1:5, respectively.

Anionic Surfactant Scavenger

The composition may contain an anionic surfactant scavenger. The surfactant scavenger is preferably a water soluble cationic and/or zwitterionic scavenger compound. The cationic and zwitterionic scavenger compounds useful herein typically have a quaternized nitrogen atom or amine group. Suitable anionic surfactant scavengers, include, but not limited to monoalkyl quaternary ammonium compounds and amine precursors thereof, dialkyl quaternary ammonium compounds and amine precursors thereof, polymeric amines, polyquaternary ammonium compounds and amine precursors thereof.

Dye Transfer Inhibiting Agents—

The compositions may also include from about 0.0001%, from about 0.01%, from about 0.05% by weight of the compositions to about 10%, about 2%, or even about 1% by weight of the compositions of one or more dye transfer inhibiting agents such as polyvinylpyrrolidone polymers, polyamine N-oxide polymers, copolymers of N-vinylpyrrolidone and N-vinylimidazole, polyvinyloxazolidones and polyvinylimidazoles or mixtures thereof.

Perfume:

The optional perfume component may comprise a component selected from the group consisting of (1) a perfume capsule, or a moisture-activated perfume capsule, comprising a perfume carrier and an encapsulated perfume composition, wherein said perfume carrier may be selected from the group consisting of cyclodextrins, starch capsules, porous carrier capsules, and mixtures thereof; and wherein said encapsulated perfume composition may comprise low volatile perfume ingredients, high volatile perfume ingredients, and mixtures thereof;

(2) a pro-perfume;

(3) a low odor detection threshold perfume ingredients, wherein said low odor detection threshold perfume ingredients may comprise less than about 25%, by weight of the total neat perfume composition; and (4) mixtures thereof; and Porous Carrier Capsule—A portion of the perfume composition can also be absorbed onto and/or into a porous carrier, such as zeolites or clays, to form perfume porous carrier capsules in order to reduce the amount of free perfume in the multiple use fabric conditioning composition.

Pro-perfume—The perfume composition may additionally include a pro-perfume. Pro-perfumes may comprise nonvolatile materials that release or convert to a perfume material as a result of, e.g., simple hydrolysis, or may be pH-change-triggered pro-perfumes (e.g. triggered by a pH drop) or may be enzymatically releasable pro-perfumes, or light-triggered pro-perfumes. The pro-perfumes may exhibit varying release rates depending upon the pro-perfume chosen.

Perfume Delivery Systems

As disclosed, the benefits of the perfumes disclosed herein may be further enhanced by employing a perfume delivery system to apply such perfumes. Non-limiting examples of suitable perfume delivery systems, methods of making perfume delivery systems and the uses of such perfume delivery systems are disclosed in USPA 2007/0275866 A1. Such perfume delivery systems include:

Polymer Assisted Delivery (PAD):

This perfume delivery technology uses polymeric materials to deliver perfume materials. Classical coacervation, water soluble or partly soluble to insoluble charged or neutral polymers, liquid crystals, hot melts, hydrogels, perfumed plastics, capsules, nano- and micro-latexes, polymeric film formers, and polymeric absorbents, polymeric adsorbents, etc. are some examples. PAD includes but is not limited to:

Matrix Systems:

The fragrance is dissolved or dispersed in a polymer matrix or particle. Perfumes, for example, may be 1) dispersed into the polymer prior to formulating into the product or 2) added separately from the polymer during or after formulation of the product. Diffusion of perfume from the polymer is a common trigger that allows or increases the rate of perfume release from a polymeric matrix system that is deposited or applied to the desired surface (situs), although many other triggers are known that may control perfume release. Absorption and/or adsorption into or onto polymeric particles, films, solutions, and the like are aspects of this technology. Nano- or micro-particles composed of organic materials (e.g., latexes) are examples. Suitable particles include a wide range of materials including, but not limited to polyacetal, polyacrylate, polyacrylic, polyacrylonitrile, polyamide, polyaryletherketone, polybutadiene, polybutylene, polybutylene terephthalate, polychloroprene, polyethylene, polyethylene terephthalate, polycyclohexylene dimethylene terephthalate, polycarbonate, polychloroprene, polyhydroxyalkanoate, polyketone, polyester, polyetherimide, polyethersulfone, polyethylenechlorinates, polyimide, polyisoprene, polylactic acid, polymethylpentene, polyphenylene oxide, polyphenylene sulfide, polyphthalamide, polypropylene, polystyrene, polysulfone, polyvinyl acetate, polyvinyl chloride, as well as polymers or copolymers based on acrylonitrile-butadiene, cellulose acetate, ethylene-vinyl acetate, ethylene vinyl alcohol, styrene-butadiene, vinyl acetate-ethylene, and mixtures thereof.

Silicones are also examples of polymers that may be used as PDT, and can provide perfume benefits in a manner similar to the polymer-assisted delivery "matrix system". Such a PDT is referred to as silicone-assisted delivery (SAD). One may pre-load silicones with perfume, or use them as an equilibrium system as described for PAD. Examples of silicones include polydimethylsiloxane and polyalkyldimethylsiloxanes. Other examples include those with amine functionality, which may be used to provide benefits associated with amine-assisted delivery (AAD) and/or polymer-assisted delivery (PAD) and/or amine-reaction products (ARP).

Reservoir Systems:

Reservoir systems are also known as a core-shell type technology, or one in which the fragrance is surrounded by a perfume release controlling membrane, which may serve as a protective shell. The material inside the capsule is referred to as the core, internal phase, or fill, whereas the wall is sometimes called a shell, coating, or membrane. Microparticles or pressure sensitive capsules or capsules are examples of this technology. Capsules of the current invention are formed by a variety of procedures that include, but are not limited to, coating, extrusion, spray-drying, interfacial, in-situ and matrix polymerization. The possible shell materials vary widely in their stability toward water. Among the most stable are polyoxymethyleneurea (PMU)-based materials, which may hold certain PRMs for even long periods of time in aqueous solution (or product). Such systems include but are not limited to urea-formaldehyde and/or melamine-formaldehyde. Gelatin-based capsules may be prepared so that they dissolve quickly or slowly in water, depending for example on the degree of cross-linking. Many other capsule wall materials are available and vary in the degree of perfume diffusion stability observed. Without wishing to be bound by theory, the rate of release of perfume from a capsule, for example, once deposited on a surface is typically in reverse order of in-product perfume diffusion stability. As such, urea-formaldehyde and melamine-formaldehyde capsules for example, typically require a release mechanism other than, or in addition to, diffusion for release, such as mechanical force (e.g., friction, pressure, shear stress) that serves to break the capsule and increase the rate of perfume (fragrance) release. Other triggers include melting, dissolution, hydrolysis or other chemical reaction, electromagnetic radiation, and the like. The use of pre-loaded capsules requires the proper ratio of in-product stability and in-use and/or on-surface (on-situs) release, as well as proper selection of PRMs. Capsules that are based on urea-formaldehyde and/or melamine-formaldehyde are relatively stable, especially in near neutral aqueous-based solutions. These materials may require a friction trigger which may not be applicable to all product applications. Other capsule materials (e.g., gelatin) may be unstable in aqueous-based products and may even provide reduced benefit (versus free perfume control) when in-product aged. Scratch and sniff technologies are yet another example of PAD.

In one aspect, the capsule wall material may comprise: melamine, polyacrylamide, silicones, silica, polystyrene, polyurea, polyurethanes, polyacrylate based materials, gelatin, styrene malic anhydride, polyamides, and mixtures thereof. In one aspect, said melamine wall material may comprise melamine crosslinked with formaldehyde, melamine-dimethoxyethanol crosslinked with formaldehyde, and mixtures thereof. In one aspect, said polystyrene wall material may comprise polyestyrene cross-linked with divinylbenzene. In one aspect, said polyurea wall material may comprise urea crosslinked with formaldehyde, urea crosslinked with gluteraldehyde, and mixtures thereof. In one aspect, said polyacrylate based materials may comprise polyacrylate formed from methylmethacrylate/dimethylaminomethyl methacrylate, polyacrylate formed from amine acrylate and/or methacrylate and strong acid, polyacrylate formed from carboxylic acid acrylate and/or methacrylate monomer and strong base, polyacrylate formed from an amine acrylate and/or methacrylate monomer and a carboxylic acid acrylate and/or carboxylic acid methacrylate monomer, and mixtures thereof. In one aspect, the encapsulated perfume may be coated with a deposition aid, a cationic polymer, a non-ionic polymer, an anionic polymer, or mixtures thereof. Suitable polymers may be selected from the group consisting of: polyvinylformaldehyde, partially hydroxylated polyvinylformaldehyde, polyvinylamine, polyethyleneimine, ethoxylated polyethyleneimine, polyvinylalcohol, polyacrylates, and combinations thereof. In one aspect, one or more types of encapsulated perfumes, for example two types of encapsulated perfumes each having a different benefit agent, and/or processing parameters may be used.

Molecule-Assisted Delivery (MAD):

Non-polymer materials or molecules may also serve to improve the delivery of perfume. Without wishing to be bound by theory, perfume may non-covalently interact with organic materials, resulting in altered deposition and/or release. Non-limiting examples of such organic materials include but are not limited to hydrophobic materials such as organic oils, waxes, mineral oils, petrolatum, fatty acids or esters, sugars, surfactants, liposomes and even other perfume raw material (perfume oils), as well as natural oils, including body and/or other soils. Perfume fixatives are yet another example. In one aspect, non-polymeric materials or molecules have a C Log P greater than about 2.

Cyclodextrin (CD):

This technology approach uses a cyclic oligosaccharide or cyclodextrin to improve the delivery of perfume. Typically, a perfume and cyclodextrin (CD) complex is formed. Such complexes may be preformed, formed in-situ, or formed on or in the situs. Without wishing to be bound by theory, loss of water may serve to shift the equilibrium toward the CD-Perfume complex, especially if other adjunct ingredients (e.g., surfactant) are not present at high concentration to compete with the perfume for the cyclodextrin cavity. A bloom benefit may be achieved if water exposure or an increase in moisture content occurs at a later time point. In addition, cyclodextrin allows the perfume formulator increased flexibility in selection of PRMs. Cyclodextrin may be pre-loaded with perfume or added separately from perfume to obtain the desired perfume stability, deposition or release benefit.

Starch Encapsulated Accord (SEA):

The use of a starch encapsulated accord (SEA) technology allows one to modify the properties of the perfume, for example, by converting a liquid perfume into a solid by adding ingredients such as starch. The benefit includes increased perfume retention during product storage, especially under non-aqueous conditions. Upon exposure to moisture, a perfume bloom may be triggered. Benefits at other moments of truth may also be achieved because the starch allows the product formulator to select PRMs or PRM concentrations that normally cannot be used without the presence of SEA. Another technology example includes the use of other organic and inorganic materials, such as silica to convert perfume from liquid to solid.

Zeolite & Inorganic Carrier (ZIC):

This technology relates to the use of porous zeolites or other inorganic materials to deliver perfumes. Perfume-loaded zeolite may be used with or without adjunct ingredients used for example to coat the perfume-loaded zeolite (PLZ) to change its perfume release properties during product storage or during use or from the dry situs. Silica is another form of ZIC. Another example of a suitable inorganic carrier includes inorganic tubules, where the perfume or other active material is contained within the lumen of the nano- or micro-tubules. Preferably, the perfume-loaded inorganic tubule (or Perfume-Loaded Tubule or PLT) is a mineral nano- or micro-tubule, such as halloysite or mixtures of halloysite with other inorganic materials, including other clays. The PLT technology may also comprise additional ingredients on the inside and/or outside of the tubule for the purpose of improving in-product diffusion stability, deposition on the desired situs or for controlling the release rate of the loaded perfume. Monomeric and/or polymeric materials, including starch encapsulation, may be used to coat, plug, cap, or otherwise encapsulate the PLT.

Polymeric Dyes—

Suitable polymeric dyes include polymeric dyes selected from the group consisting of polymers containing covalently bound (sometimes referred to as conjugated) chromogens, (dye-polymer conjugates), for example polymers with chromogens co-polymerized into the backbone of the polymer and mixtures thereof.

In another aspect, suitable polymeric dyes include polymeric dyes selected from the group consisting of fabric-substantive colorants sold under the name of Liquitint® (Milliken, Spartanburg, S.C., USA), dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety and mixtures thereof. In still another aspect, suitable polymeric dyes include polymeric dyes selected from the group consisting of Liquitint® Violet Conn., carboxymethyl cellulose (CMC) covalently bound to a reactive blue, reactive violet or reactive red dye such as CMC conjugated with C.I. Reactive Blue 19, sold by Megazyme, Wicklow, Ireland under the product name AZO-CM-CELLULOSE, product code S-ACMC, alkoxylated triphenylmethane polymeric colourants, alkoxylated thiophene polymeric colourants, and mixtures thereof.

The aforementioned fabric hueing agents can be used in combination (any mixture of fabric hueing agents can be used).

Formaldehyde Scavenger—

In one aspect perfume particles may be combined with a formaldehyde scavenger. In one aspect, such perfume capsules may comprise the perfume capsules of the present invention. Suitable formaldehyde scavengers include materials selected from the group consisting of sodium bisulfite, melamine, urea, ethylene urea, cysteine, cysteamine, lysine, glycine, serine, carnosine, histidine, glutathione, 3,4-di-aminobenzoic acid, allantoin, glycouril, anthranilic acid, methyl anthranilate, methyl 4-aminobenzoate, ethyl acetoacetate, acetoacetamide, malonamide, ascorbic acid, 1,3-dihydroxyacetone dimer, biuret, oxamide, benzoguanamine, pyroglutamic acid, pyrogallol, methyl gallate, ethyl gallate, propyl gallate, triethanol amine, succinamide, thiabendazole, benzotriazol, triazole, indoline, sulfanilic acid, oxamide, sorbitol, glucose, cellulose, poly(vinyl alcohol), partially hydrolyzed poly(vinylformamide), poly(vinyl amine), poly(ethylene imine), poly(oxyalkyleneamine), poly(vinyl alcohol)-co-poly(vinyl amine), poly(4-aminostyrene), poly (1-lysine), chitosan, hexane diol, ethylenediamine-N,N'-bisacetoacetamide, N-(2-ethylhexyl)acetoacetamide, 2-benzoylacetoacetamide, N-(3-phenylpropyl)acetoacetamide, lilial, helional, melonal, triplal, 5,5-dimethyl-1,3-cyclohexanedione, 2,4-dimethyl-3-cyclohexenecarboxaldehyde, 2,2-dimethyl-1,3-dioxan-4,6-dione, 2-pentanone, dibutyl amine, triethylenetetramine, ammonium hydroxide, benzylamine, hydroxycitronellol, cyclohexanone, 2-butanone, pentane dione, dehydroacetic acid, or a mixture thereof. These formaldehyde scavengers may be obtained from Sigma/Aldrich/Fluka of St. Louis, Mo. U.S.A. or PolySciences, Inc. of Warrington, Pa., U.S.A.

Method of Use and Treated Article

The dryer sheets disclosed herein can be used to soften a fabric. Typically, at least a portion of the fabric is contacted with said sheet during tumble drying.

A fabric treated with a dryer sheet according to any of Paragraphs A) through I) is disclosed.

A method of softening clothing comprising contacting a dryer sheet according to any of Paragraphs A) through I) with clothing in a dryer for at least one minute, preferably for a time of about 5 minutes to about 90 minutes, more preferably for a time of about 10 minutes to about 90 minutes, most preferably for a time of about 10 minutes to about 60 minutes, is disclosed.

A method of softening a fabric, said method comprising
(i) optionally washing and/or rinsing said fabric;
(ii) contacting said fabric with a dryer sheet according to Paragraphs A) through I) during drying, preferably for at least one minute, preferably for a time of about 5 minutes to about 90 minutes, more preferably for a time of about 10 minutes to about 90 minutes, most preferably for a time of about 10 minutes to about 60 minutes, preferably tumble drying;
(iii) optionally washing and/or rinsing said fabric; and
(ii) optionally passively or actively drying said fabric
is disclosed.

The use of a dryer sheet according to any of Paragraphs A) through I) to soften a fabric, is disclosed.

EXAMPLES

Example 1 Dryer Added Fabric Softener Sheet Composition

An example of a dryer added fabric softener sheet composition prepared branched polyesters a disclosed herein is found below.

| Ingredient | Example 1.1 Wt % Active | Example 1.2 Wt % Active | Example 1.3 Wt % Active | Example 1.4 Wt % Active |
|---|---|---|---|---|
| DEQA[1] | 0-50 | 30 | — | — |
| DEQA[2] | 0-50 | — | — | 10 |
| DTDMAMS[3] | 0-50 | — | 20 | — |
| 7018FA[4] | 0-50 | — | 20 | — |
| TS-20[5] | 0-15 | — | — | 10 |
| SMS[6] | 0-15 | — | — | 10 |
| SDASA[7] | 0-19 | 25 | — | 19 |
| TPED[8] | — | 3 | — | — |
| Complex[9] | 0-16.5 | 16.5 | — | 8.0 |
| Clay[10] | Balance | Balance | Balance | Balance |
| Free (Neat) Perfume | 0-4 | 0-1.5 | 0-3 | 0-1.5 |

-continued

| Ingredient | Example 1.1 Wt % Active | Example 1.2 Wt % Active | Example 1.3 Wt % Active | Example 1.4 Wt % Active |
|---|---|---|---|---|
| Encapsulated Perfume[11] | 0-4 | 0-4 | 0-2 | 0-2 |
| Branched polyester polymer[12] | 1-40 | 1-40 | 1-40 | 1-40 |
| Active Weight (g/sheet) | 2.4 | 2.4 | 1.9 | 2.4 |

(1) DEQA[1]: Di(soft tallowoyloxyethyl)dimethylammonium methyl sulfate with 25% > 7018 FA, as described below, as solvent
(2) DEQA[2]: Di(soft tallowoyloxyethyl)hydroxyethylmethylammoniun methyl sulfate with 18% » partially hydrogenated tallow fatty acid solvent
(3) DTDMAMS: Di(hydrogenated tallowalkyl)dimethylammonium methyl sulfate
(4) 7018FA: 70:30 Stearic Acid:Palmitic Acid (IV = 0) Industrene 7018 sold by Witco
(5) TS-20: Polyoxyethylene-20 Sorbitan Tristearate (Glycosperse TS-20, sold by Lonza
(6) SMS: Sorbitan Mono Stearate
(7) SDASA: 1:2 ratio of stearyl dimethyl amine: triple pressed stearic acid
(8) TPED: N,N,N',N'-Tetrakis(2-hydroxypropyl)ethylenediamine (Quadrol, sold by BASF)
(9) Complex: Beta-Cyclodextrin/Perfume Complex
(10) Clay: Calcium Bentonite Clay (Bentonite L sold by Southern Clay Products Free (Neat) Perfume
(11) PMC is a friable shell. About 50% water by weight of the PMC (including encapsulated perfume and/or blocker) is assumed. The micro capsule encapsulates perfume, malodor reduction composition, or combinations thereof with the total internal phase at about 32% active
(12) Any of the following branched polyester polymers or mixtures thereof:
Polyhydroxystearic acid stearate of weight average molecular weight of about 2800 g/mol available from Croda, Inc. New York, NY
Polyhydroxystearic acid stearate of molecular weight of about 3000 g/mol available from Lubrizol, Inc. of Cleveland. OH.
ABA type block copolymer of polyhydroxystearic acid-polyethyleneglycol-polyhydroxystearic acid of viscosity of 500-100 cps at 50° C. available from Croda, Inc, New York, NY.
ABA type block copolymer of polyhydroxystearic acid-polyethyleneglycol-polyhydroxystearic acid of viscosity of 1300-1900 cps at 50° C. available from Croda, Inc, New York, NY.

The compositions of Example 1 are mixed homogeneously and impregnated onto a non-woven polyester sheet having dimensions of about 6% in×12" (about 17.1 cm×30.5 cm) and weighing about 1 gram.

The resulting dryer added fabric softener sheet product is added to an automatic dryer by placing the dryer sheet in the automatic dryer with a load of clothing and is effective at softening the clothing while the clothing is tumble dried.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is, therefore, intended to cover in the appended claims all such changes and modifications that are within the scope of this invention.

What is claimed:

1. A dryer sheet comprising a substrate that has a surface and a branched polyester polymer that coats at least a portion of said surface, wherein said branched polyester polymer is:

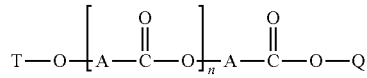

wherein:
each A is independently a branched hydrocarbon chain comprising 4 to 100 carbon atoms;
Q is selected from an alkyl chain comprising 1 to 30 carbon atoms and a hydrogen atom;
T is a hydrogen atom or a —C(O)—R wherein each R is an alkyl chain comprising 1 to 30 carbon atoms and n is an integer from 1 to about 100.

2. The dryer sheet according to claim 1, wherein said substrate is a flexible substrate that is a sheet; wherein said branched polyester polymer has a weight ratio of said branched polyester polymer to said substrate ranging from about 10:1 to about 0.5:1; and
wherein:
each said A is independently a branched hydrocarbon chain comprising from 4 to 40 carbon atoms;
T is a hydrogen atom or a —C(O)—R wherein each R is an alkyl chain comprising from 7 to 21 carbon atoms; and
said n is an integer from 4 to 40.

3. The dryer sheet according to claim 1, wherein said branched polyester polymer has a weight average molecular weight of from about 500 g/mol to about 100,000 g/mol.

4. The dryer sheet according to claim 1, wherein each A of said branched polyester polymer is independently a branched hydrocarbon with the structure

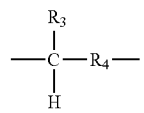

wherein each $R_3$ is a monovalent alkyl or substituted alkyl group and $R_4$ is an unsaturated or saturated divalent alkylene radical comprising from 1 to about 24 carbon atoms.

5. The dryer sheet according to claim 1, wherein each A of said branched polyester polymer has the structure:

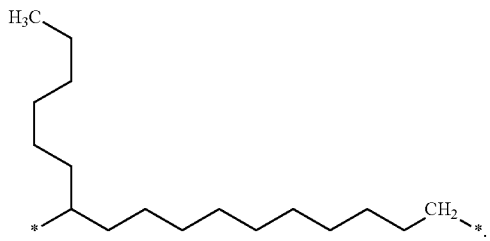

6. The dryer sheet according to claim 1, wherein the branched polyester polymer has an iodine value from about 0 to about 90.

7. The dryer sheet according to claim 1, said substrate comprises a rayon and/or polyester non-woven fabric.

8. The dryer sheet according to claim 1, said substrate comprises a chemically bonded, mechanically bonded, spun-bonded, or melt-bonded material.

9. The dryer sheet according to claim 1 further comprising perfume and/or a perfume delivery system.

10. A method of softening clothing comprising contacting a dryer sheet according to claim 1 with clothing in a dryer for at least one minute.

11. The dryer sheet according to claim 2, wherein said branched polyester polymer has a weight average molecular weight of from about 500 g/mol to about 100,000 g/mol.

12. The dryer sheet according to claim 2, wherein each A of said branched polyester polymer is independently a branched hydrocarbon with the structure

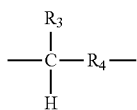

wherein each $R_3$ is a monovalent alkyl or substituted alkyl group and $R_4$ is an unsaturated or saturated divalent alkylene radical comprising from 1 to about 24 carbon atoms.

13. The dryer sheet according to claim 2, wherein each A of said branched polyester polymer has the structure:

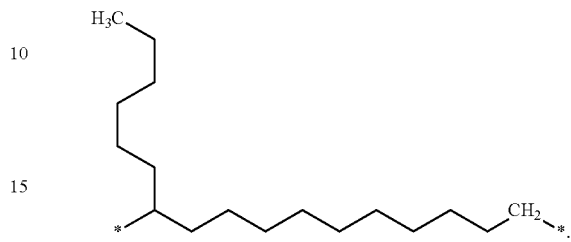

14. The dryer sheet according to claim 13, wherein the branched polyester polymer has an iodine value from about 0 to about 90.

15. The dryer sheet according to claim 14, further comprising perfume and/or a perfume delivery system.

16. A method of softening clothing comprising contacting a dryer sheet according to claim 15 with clothing in a dryer for at least one minute.

17. The dryer sheet according to claim 2, wherein the branched polyester polymer has an iodine value from about 0 to about 90.

18. The dryer sheet according to claim 17, further comprising perfume and/or a perfume delivery system.

19. The dryer sheet according to claim 2, further comprising perfume and/or a perfume delivery system.

20. The dryer sheet according to claim 19, wherein said branched polyester polymer has a weight average molecular weight of from about 500 g/mol to about 100,000 g/mol.

* * * * *